UNITED STATES PATENT OFFICE.

HENRY S. BLACKMORE, OF MOUNT VERNON, NEW YORK.

PROCESS OF MAKING HYDROCARBON AND COMBUSTIBLE GAS.

No. 819,506.    Specification of Letters Patent.    Patented May 1, 1906.

Application filed September 22, 1905. Serial No. 279,591.

*To all whom it may concern:*

Be it known that I, HENRY S. BLACKMORE, a citizen of the United States, residing at Mount Vernon, in the county of Westchester and State of New York, have invented certain new and useful Improvements in Processes of Making Hydrocarbon and Combustible Gas, of which the following is a specification.

The object of my invention is to make hydrocarbons and combustible gas, such as methane and carbonic oxid; and it consists in exposing ketones to the action of steam and heat and preferably in contact with carbon heated to incandescence.

My invention relates particularly to the production of methane ($CH_4$) from dimethyl ketone or acetone ($C_3H_6O$) for the purpose of supplying to manufactured illuminating or fuel gases a product whereby the heat units of the gas are increased on combustion, by which means an equivalent amount of heat may be obtained from poorer grades of gas, thus rendering them of value for heating and illuminating purposes, especially with burners of the Welsbach type.

It is well known that many natural gases are rich in heat-producing hydrocarbons, such as methane, some of which contain as high as ninety-five per cent.; but it is obvious that they can only be employed to advantage at points in proximity to gas-wells on account of the expense of piping or transportation in compressed form to distant points, which thus renders them of no commercial value for mixing with manufactured water or other gas in large cities. I have, however, discovered that the natural hydrocarbons from the gas-wells can be readily transformed into liquid or solid ketones by chemical treatment, so that they can be readily shipped or transported and then by action of steam, carbon, and heat reconverted into hydrocarbons and combustible gases again. For instance, I can convert the methane into dimethyl ketone or acetone by the action of carbon dioxid and heat by proper manipulation and ship the same in tank-cars or by other convenient means to distant gas-works, where by exposing the same to the action of superheated steam and carbon heated to incandescence it is again converted into methane ($CH_4$) thus:

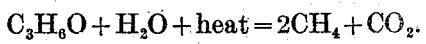

$$C_3H_6O + H_2O + \text{heat} = 2CH_4 + CO_2.$$

This mixture of methane and carbon dioxid being in contact with heated carbon is transformed into methane and carbonic oxid, thus

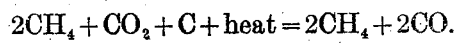

$$2CH_4 + CO_2 + C + \text{heat} = 2CH_4 + 2CO.$$

It is found that one barrel or about four cubic feet of acetone thus treated will produce about five thousand seven hundred and twenty cubic feet of combustible gas containing about fifty per cent., by volume, of methane ($CH_4$.)

In carrying out my invention I prefer to introduce acetone, dimethyl ketone, gradually by dropping the same into superheated steam at about 400° Fahrenheit in about equivalent proportions for reaction and convey the mixture into a furnace containing carbon, such as coal or coke heated to incandescence, whereby a reaction takes place, as above described, producing methane and carbonic oxid, which can be afterward mixed with water-gas, oil-gas, or utilized as desired.

It is obvious that many other constituents of natural gas, such as the higher hydrocarbons, may be transformed into ketones which may exist in liquid or solid form, the same being applicable to transformation by my process by the action of steam, carbon, and heat into hydrocarbon and carbonic oxid as before described, and I do not limit myself to the employment of dimethyl ketone, as many other ketones, simple and complex, may be employed for producing other hydrocarbons and carbonic oxid by my process, which consists, essentially, in transforming ketones by the action of superheated steam into hydrocarbons and carbonic oxid and preferably in contact with incandescent carbon, whereby the resulting product is a combustible gas consisting of a mixture of hydrocarbon and carbonic oxid.

It is obvious that the carbon in contact with which the mixture of superheated steam and acetone or other reactive product is brought may be heated by electrical resistance or any other convenient means.

Having now described my invention, what

I claim as new, and desire to secure by Letters Patent, is—

1. The process of producing hydrocarbon, which consists in exposing a ketone to the action of steam and heat.

2. The process of producing hydrocarbon, which consists in exposing a gaseous mixture of ketone and steam to the action of heat.

3. The process of producing methane, which consists in exposing acetone, dimethyl ketone, to the action of superheated steam.

4. The process of producing combustible gas, which consists in exposing a mixture of ketone and superheated steam to the action of carbon heated to incandescence.

In testimony whereof I affix my signature in presence of two witnesses.

HENRY S. BLACKMORE.

Witnesses:
C. C. WRIGHT,
B. A. SMITH.